US012555958B2

(12) United States Patent
Li

(10) Patent No.: US 12,555,958 B2
(45) Date of Patent: Feb. 17, 2026

(54) ELECTRICAL CONNECTOR ASSEMBLY, FIRST ELECTRICAL CONNECTOR AND SECOND ELECTRICAL CONNECTOR

(71) Applicant: Molex, LLC, Lisle, IL (US)

(72) Inventor: Guo-Li Li, Shanghai (CN)

(73) Assignee: Molex, LLC, Lisle, IL (US)

( * ) Notice: Subject to any disclaimer, the term of this patent is extended or adjusted under 35 U.S.C. 154(b) by 299 days.

(21) Appl. No.: 18/344,382

(22) Filed: Jun. 29, 2023

(65) Prior Publication Data

US 2024/0291205 A1 Aug. 29, 2024

(30) Foreign Application Priority Data

Feb. 27, 2023 (CN) ......................... 202320330040.7

(51) Int. Cl.
*H01R 13/64* (2006.01)
*H01R 13/74* (2006.01)

(52) U.S. Cl.
CPC ........... *H01R 13/64* (2013.01); *H01R 13/743* (2013.01)

(58) Field of Classification Search
CPC .............................. H01R 13/743; H01R 13/64
USPC .................................. 439/571–572, 544–562
See application file for complete search history.

(56) References Cited

U.S. PATENT DOCUMENTS

| | | |
|---|---|---|
| D316,080 S | 4/1991 | Inaba |
| D323,150 S | 1/1992 | Takenouchi et al. |
| 5,342,221 A | 8/1994 | Peterson |
| D410,629 S | 6/1999 | Bandura et al. |
| 6,514,098 B2 | 2/2003 | Marpoe, Jr. et al. |
| D494,141 S | 8/2004 | Spink, Jr. |
| D544,844 S | 6/2007 | Askeland et al. |
| D559,187 S | 1/2008 | Hayashi |
| D751,990 S | 3/2016 | Ikeda et al. |

(Continued)

FOREIGN PATENT DOCUMENTS

| | | |
|---|---|---|
| CN | 101420090 B | 4/2013 |
| CN | 208904307 U | 5/2019 |
| KR | 3004158350000 S | 6/2006 |
| KR | 20090012591 A | 2/2009 |
| TW | D214259 S | 9/2021 |

OTHER PUBLICATIONS

Landwin, "3940F Dual Row Plug Housing Type-1",Retrieved from internet, http://www.landwin.com.tw/SubSeries-en.php?MainType=1&Sub1Type=9&SrsId=252 ,retrieved on Dec. 26, 2024 , 1 page.

(Continued)

*Primary Examiner* — Tulsidas C Patel
*Assistant Examiner* — Thaslimur Rahman

(57) ABSTRACT

An electrical connector assembly, a first electrical connector and a second electrical connector are provided. The first electrical connector includes a first insulating body and conductive terminals. The first insulating body includes a mis-insertion proof connecting board and a mis-insertion proof rib. The second electrical connector includes a second insulating body and conductive terminals. The second insulating body includes a mis-insertion proof notch and mis-insertion proof avoiding openings. The mis-insertion proof connecting board is received in mis-insertion proof notch, the mis-insertion proof rib inserts into the mis-insertion proof avoiding opening, so that the electrical connector assembly includes two different mis-insertion proof structures.

20 Claims, 16 Drawing Sheets

(56) References Cited

U.S. PATENT DOCUMENTS

| | | | | |
|---|---|---|---|---|
| D791,707 | S | 7/2017 | Li et al. | |
| D803,161 | S | 11/2017 | Li et al. | |
| D840,938 | S | 2/2019 | Hsu | |
| D894,126 | S | 8/2020 | Somanathapura Ramanna et al. | |
| D894,127 | S | 8/2020 | Somanathapura Ramanna | |
| D895,552 | S | 9/2020 | Somanathapura Ramanna et al. | |
| D936,013 | S | 11/2021 | C et al. | |
| D937,213 | S | 11/2021 | C et al. | |
| D938,362 | S | 12/2021 | Ito et al. | |
| D1,017,552 | S | 3/2024 | Lee | |
| 2011/0076889 | A1 | 3/2011 | Rossman et al. | |
| 2011/0294361 | A1* | 12/2011 | Schrader | H01R 13/64 439/680 |
| 2016/0336669 | A1* | 11/2016 | Li | H01R 13/432 |
| 2020/0313369 | A1* | 10/2020 | Kodaira | H01R 13/743 |
| 2022/0393402 | A1* | 12/2022 | Pan | H01R 13/629 |
| 2024/0291205 | A1 | 8/2024 | Li | |
| 2024/0322505 | A1 | 9/2024 | Li et al. | |

OTHER PUBLICATIONS

Molex, "35150-0400 Male 4 Pole 2 Row Circuit Board Connector Housing 6.2mm",Retrieved from internet, https://www.amazon.sg/Molex-35150-0400-Circuit-Connector-Housing/dp/BOOFE1 UTF6 ,retrieved on Dec. 26, 2024, 1 Page.

Molex, "39-01-2061 Plug", retrieved from internet https://www.be-electronics.com/product_p/39-01-2061.htm, retrieved on Dec. 26, 2024, pp. 1-2.

Molex, "CP-3.3 Wire to Board Connectors", retrieved from internet https://www.molex.com/content/dam/molex/molex-dot-com/en_us/pdf/datasheets/987652-3281.pdf?inline, retrieved on Dec. 24, 2024, pp. 1-2.

Molex,"HFM-High-speed FAKRA Mini Coaxial Cable Solution", Retrieved from internet https ://www.molex.com/content/dam/molex/molex-dot-com/en_us/pdf/ datasheets/987651-8942.pdf?inline, Retrieved on Dec. 26, 2024 , pp. 1-3.

* cited by examiner

ELECTRICAL CONNECTOR ASSEMBLY, FIRST ELECTRICAL CONNECTOR AND SECOND ELECTRICAL CONNECTOR

RELATED APPLICATION

This application claims priority to Chinese Utility Application No. 202320330040.7, which was filed Feb. 27, 2023; the contents therein are incorporated by reference in its entirety.

TECHNICAL FIELD

The present disclosure relates to the technical field of connectors, and particularly relates to an electrical connector assembly, a first electrical connector and a second electrical connector.

BACKGROUND

Mis-insertion proof structure on an electrical connector generally is often relatively simple, cannot meet mis-insertion proof requirement on complicated application circumstance having a plurality of electrical connectors which have similar appearances.

Chinese patent CN101420090B discloses a connector assembly, which includes a first connector configured to be mounted on a panel and a second electrical connector which may mate with the first connector. The first connector includes a first housing which has a plurality of first contact cavities, the plurality of first contact cavities extend from a mating end to a contact loading end and are arranged as rows and columns. The second electrical connector includes a second housing, the second housing includes a plurality of silos, each silo has a second contact cavity which extends from a second mating end to a second contact loading end, each silo is configured to be received in the corresponding first contact cavity of the first connector. The plurality of first contact cavities includes first polarizing contact cavities, the first polarizing contact cavities are configured to receive the complementary silos of the second electrical connector, so as to position the first connector relative to the second electrical connector. And, the first housing of the first connector includes a guide receptacle, and the first polarizing contact cavity includes a first polarizing contact cavity wall, the first polarizing contact cavity wall has a slot which is opened into the guide receptacle; the second housing of the second electrical connector includes a guide post and a ridge, the ridge is formed between the guide post and one silo, when the first connector and the second electrical connector mate with each other, the ridge is received in the slot.

In this technical solution, the first polarizing contact cavities and the complementary silos realize proper mating between the first connector and the second electrical connector by cooperation therebetween, thus may have more mis-insertion proof structures to avoid wrong insertion. However, in this technical solution, protrusions of the complementary silos which are positioned in a lower portion of the second electrical connector extend outwardly, the protrusions extending outwardly would increase a size of an outer profile of the second electrical connector, thus is only adapted to a connector which has a larger volume and has loose requirement on a size of an outer profile, but is not beneficial to be applied to a compact connector which has a smaller size, therefore it is still be further improved.

SUMMARY

The technical problem to be solved by the present disclosure is to provide an electrical connector assembly, a first electrical connector and a second electrical connector which can handle mis-insertion proof requirement on complicated application circumstance having a plurality of electrical connectors with similar appearances and have advantages of small volume and compact structure, in order to overcome the deficiency in the prior art.

In order to solve the technical problem, the present disclosure provides a first electrical connector, comprising: a first insulating body comprising a main body portion and a plurality of terminal receiving posts extending out forwardly from the main body portion, the terminal receiving post is a hollow post shape which has a forward opening, the plurality of terminal receiving posts are spaced apart from each other and the two adjacent terminal receiving post are formed therebetween with an opening having a first depth, at least two adjacent terminal receiving posts are connected therebetween with a mis-insertion proof connecting board, a front edge of the mis-insertion proof connecting board is positioned behind front edges of the at least two terminal receiving posts so that a notch having a second depth is formed, the second depth is less than the first depth, a mis-insertion proof rib upwardly or downwardly protrudes from at least one terminal receiving post; a plurality of first conductive terminals, the plurality of first conductive terminals are respectively received in the plurality of terminal receiving posts.

In an embodiment, the mis-insertion proof rib is a solid quadrangular prism which protrudes upwardly from a side of a top surface of the corresponding terminal receiving post.

In an embodiment, the main body portion is provided therein with a plurality of terminal grooves which are partitioned from each other, each terminal groove is correspondingly communicated with one terminal receiving post, a rear end of each first conductive terminal connects one cable; a rear portion of the main body portion is further provided with a terminal position fixing means, two sides of the main body portion are each provided with a limiting-position protrusion, the terminal position fixing means comprises a plurality of abutting pieces which forwardly protrude and two limiting-position latches which are positioned at two sides of the terminal position fixing means, each abutting piece respectively abuts against the corresponding first conductive terminal, the two limiting-position latches respectively latch with the two limiting-position protrusions.

In an embodiment, the mis-insertion proof connecting board is connected between lower edges of the two adjacent terminal receiving posts, and a rear side of the mis-insertion proof connecting board is connected to the main body portion; a top portion of the main body portion is provided with a locking means, the locking means comprises a protective shell and an elastic locking arm provided in the protective shell.

The present disclosure further provides a second electrical connector, comprising: a second insulating body, an interior of the second insulating body is provided with a plurality of mating cavities which extend along a front-rear direction and each have a first depth, two adjacent mating cavities are formed therebetween with a partitioning wall, at least one partitioning wall is formed thereon with a mis-insertion proof notch which is opened toward the front and has a second depth, the second depth is less than the first depth, a top portion or a bottom portion of at least one mating cavity is formed with a mis-insertion proof avoiding opening; a plurality of second conductive terminals, the plurality of second conductive terminals are respectively received in the plurality of mating cavities.

In an embodiment, two sides of the second insulating body each are provided with a panel latch, a front end of the panel latch is connected on the second insulating body, a rear end of the panel latch is suspended and has a gap from a side wall of the second insulating body, a rear wall surface of the panel latch is provided thereon with multiple steps.

In an embodiment, the second insulating body further comprises panel stopping portions which protrude and are provided at two sides of a top portion of the second insulating body and two sides of a bottom portion of the second insulating body, the panel stopping portion has a vertical stopping surface which faces toward the front.

In an embodiment, a center of a top portion of each mating cavity is provided with a notch which protrudes upwardly, a width of the notch is less than a width of the mating cavity, the notch of at least one mating cavity expands toward a side of the at least one mating cavity and the expanded width of at least one mating cavity is larger than the width of the notch of each of the other mating cavities, the notch which has the larger width constitutes the mis-insertion proof avoiding opening.

In an embodiment, a top portion of the second insulating body is provided with a latching protrusion which protrudes upwardly and two panel limiting-position ribs which are respectively provided at two sides of the latching protrusion, a front side of the latching protrusion, front sides of the two panel limiting-position ribs and a front side of the mis-insertion proof notch each are provided with a guiding oblique surface.

The present disclosure further provides an electrical connector assembly, comprising the first electrical connector and the second electrical connector, the terminal receiving post of the first electrical connector correspondingly inserting into the mating cavity of the second electrical connector, so that the first conductive terminal and the second conductive terminal correspondingly establishing an electrical connection, the mis-insertion proof rib correspondingly inserting into the mis-insertion proof avoiding opening, the mis-insertion proof connecting board correspondingly inserting into the mis-insertion proof notch of the second electrical connector.

In comparison with the prior art, the present disclosure at least has the following advantages: in the electrical connector assembly of the present embodiment, the first electrical connector comprises a mis-insertion proof connecting board which is connected between at least two adjacent terminal receiving posts and a mis-insertion proof rib which protrudes upwardly from at least one terminal receiving post, the second electrical connector includes the mis-insertion proof notch which is formed on at least one partitioning wall and is opened toward the front and the mis-insertion proof avoiding opening which is provided to at least one the mating cavity, the mis-insertion proof connecting board inserts into the mis-insertion proof notch of the second electrical connector, on the other hand, the mis-insertion proof rib correspondingly inserts into the mis-insertion proof avoiding opening, the electrical connector assembly includes two mis-insertion proof structures, by that the two different mis-insertion proof structures cooperate and combine at different positions, many mis-insertion proof combination solutions may be obtained, which is convenient to be applied in complicated application circumstance which have many connectors, connectors which are in different uses are prevents from wrongly mating. And such a mis-insertion proof structure that the mis-insertion proof connecting board of the first electrical connector correspondingly inserts into the mis-insertion proof notch of the second electrical connector utilizes a spacing between the two adjacent terminal receiving posts and the portioning wall between two adjacent mating cavities, which does not increase sizes of the appearances of the electrical connectors, the electrical connectors have advantages of small volume and compact structure, is particularly adapted to a small size electrical connector which has the less number of conductive terminals.

DETAILED DESCRIPTION OF THE PREFERRED EMBODIMENTS

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

As such, references to a feature are intended to describe a feature of an embodiment of the present disclosure do not to imply that every embodiment thereof must have the described feature. Furthermore, it should be noted that the description illustrates a number of features. While certain features may be combined together to illustrate potential system designs, those features may also be used in other combinations not expressly described. Thus, the described combinations are not intended to be limiting, unless otherwise noted.

In the embodiments illustrated in the figures, representations of directions such as up, down, left, right, front and rear, used for explaining the structure and movement of the various components of the present disclosure, are not absolute, but relative. These representations are appropriate when the components are in the position shown in the figures. If the description of the position of the components changes, however, these representations are to be changed accordingly.

Hereinafter, embodiments of the present disclosure will be described in detail in combination with the drawings. The following embodiments and features of the embodiments may be combined with each other without confliction.

Firstly referring to FIG. 1 to FIG. 11, an electrical connector assembly 100 of the present preferred embodiment includes a first electrical connector 1 and a second electrical connector 2, and a fixing panel 3 which is used to fix the second electrical connector 2. The first electrical connector 1 and the second electrical connector 2 has two different mis-insertion proof structures therebetween, and the two different mis-insertion proof structures are capable of obtaining various mis-insertion proof manners by different position combinations, which avoids connectors with respect to different uses wrongly mating with each other and is adapted to complicated application circumstance which has electrical connectors with various similar appearances.

For convenience of description, hereinafter, a direction is described as taking a mating direction of the first electrical connector 1 and the second electrical connector 2 as front and taking a direction away from the mating direction as rear.

Figure 7:
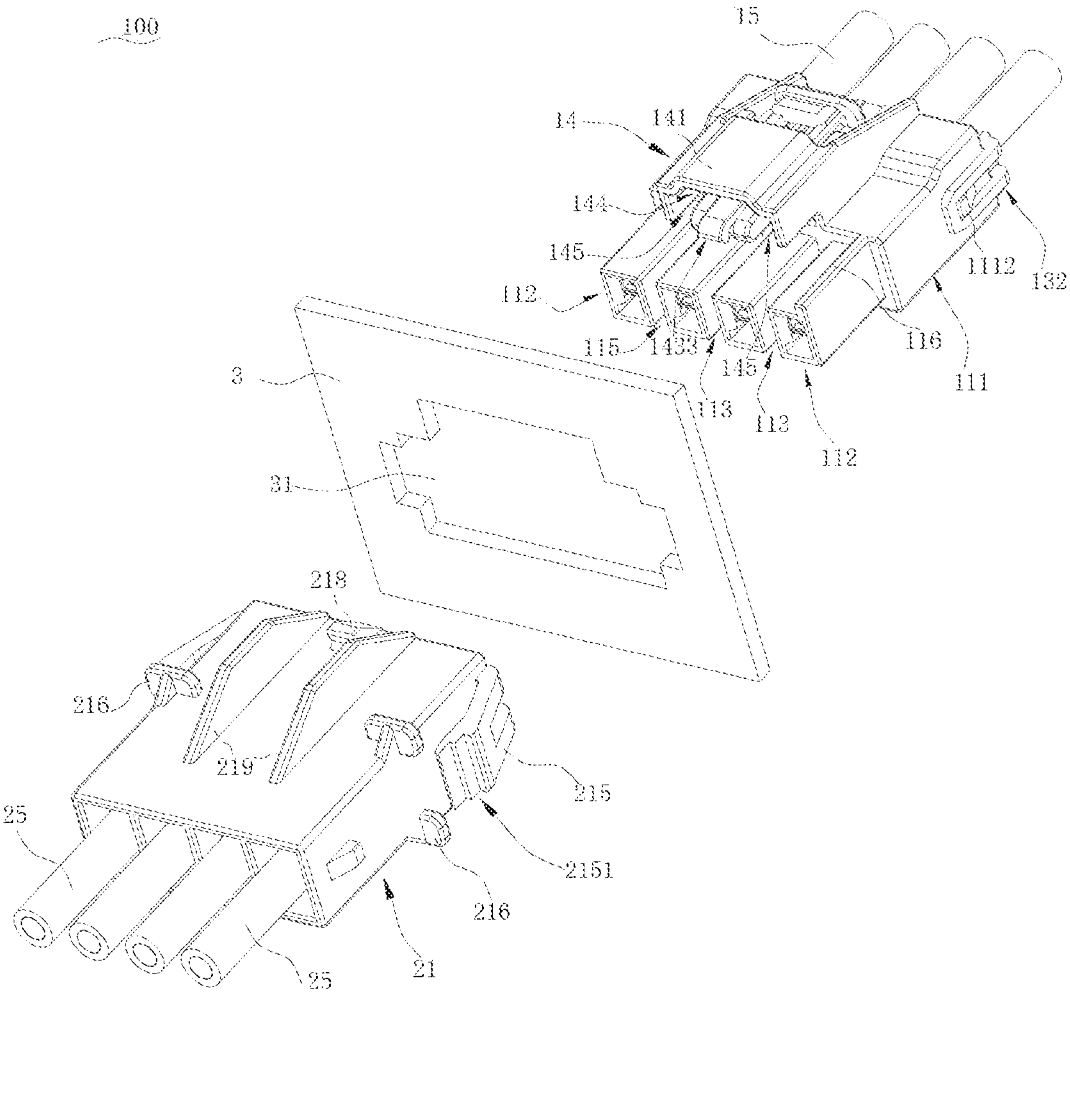
FIG. 7 is a further exploded perspective view of FIG. 6.
Figure 8:
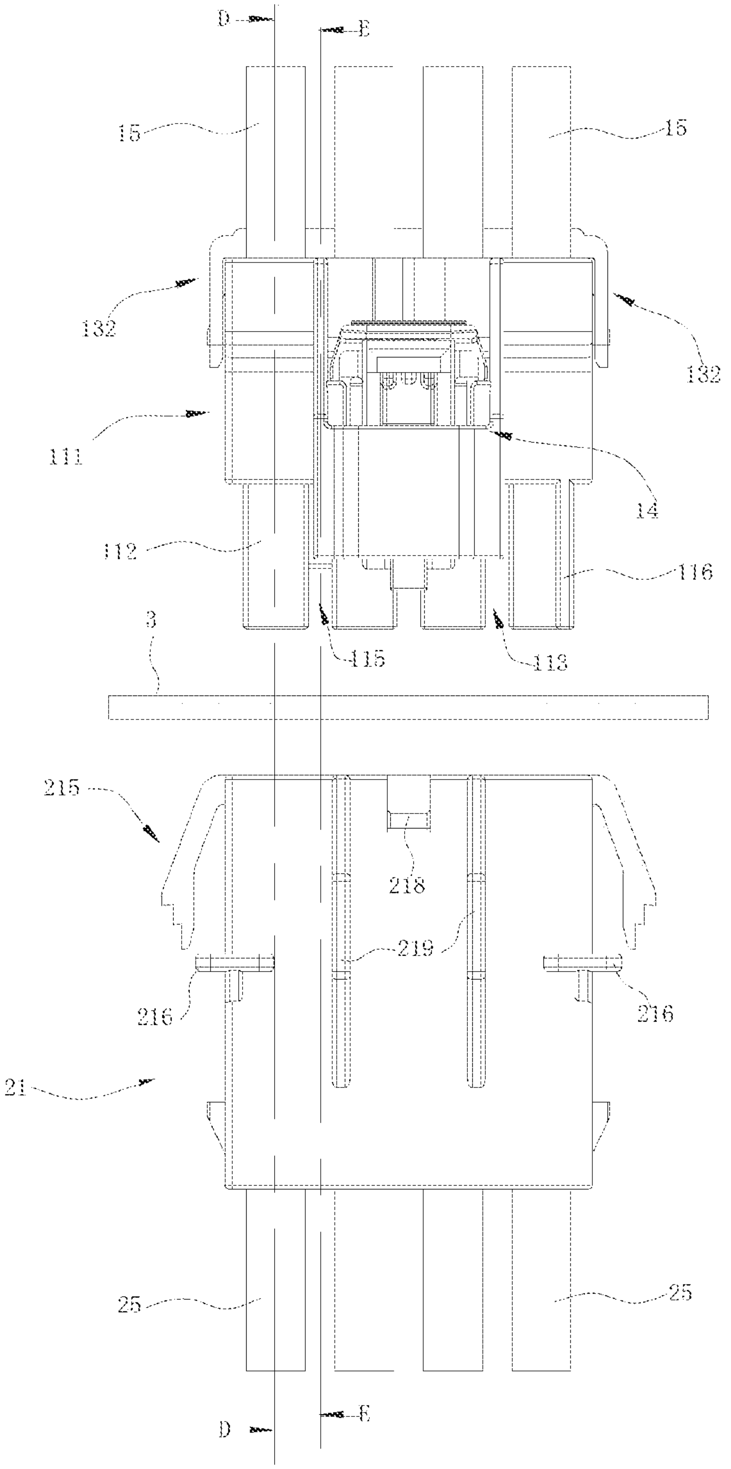
FIG. 8 is an exploded top view of the fixing panel, the first electrical connector and the second electrical connector of the first embodiment of the electrical connector assembly of the present disclosure.

As shown in FIG. 7, the fixing panel 3 is opened with a penetrating hole 31 thereon, the second electrical connector 2 passes through the penetrating hole 31 so that the second electrical connector 2 is fixed on the fixing panel 3, the fixing panel 3 may be an outer casing of an electronic device.

Referring to FIG. 5 to FIG. 11, the first electrical connector 1 includes a first insulating body 11, a plurality of first conductive terminals 12 which are mounted in the first insulating body 11 and cables 15 which are respectively connected with the plurality of first conductive terminals 12 and extend out from a rear end of the first insulating body 11.

The first insulating body 11 includes a main body portion 111 and a plurality of terminal receiving posts 112 which extend out forwardly from the main body portion 111. The first insulating body 11 is an insulating material, and preferably is an integrally formed structure.

The main body portion 111 is substantially square. The main body portion 111 is provided therein with a plurality of terminal grooves 1111 which are partitioned from each other, each terminal groove 1111 is respectively communicated with and coaxial with one terminal receiving post 112, each terminal receiving post 112 receives one first conductive terminal 12 therein.

The first electrical connector 1 of the present embodiment is a four position electrical connector, which has four terminal grooves 1111, correspondingly also has four first conductive terminals 12, the four terminal grooves 1111 are arranged as one row. In other embodiments, the first electrical connector 1 also may be a single row multiple position electrical connector which is provided as a single row and has more or less terminal grooves, or may be a multiple position electrical connector which is provided as double or more rows.

The plurality of terminal receiving posts 112 and the plurality of terminal grooves 1111 are provided as one-to-one correspondence. The terminal receiving post 112 is a hollow post shape which has a forward opening. The plurality of terminal receiving posts 112 are spaced apart from each other and the two adjacent terminal receiving posts 112 are formed therebetween with an opening 113 having a first depth d1.

Referring to FIG. 8 to FIG. 15, at least two adjacent the terminal receiving posts 112 are connected therebetween with a mis-insertion proof connecting board 114, a front edge of the mis-insertion proof connecting board 114 is positioned behind front edges of the at least two adjacent terminal receiving post 112, so that a notch 115 having a second depth d2 is formed. Here, the second depth d2 is less than the first depth d1. It is noted that, the first depth dl and the second depth d2 refer to a size extending along a front-rear direction. In the present embodiment, the mis-insertion proof connecting board 114 is positioned between the two terminal receiving posts 112 which are at leftmost of FIG. 11.

And, a mis-insertion proof rib 116 upwardly or downwardly protrudes from at least one terminal receiving post 112. Specifically, in the present embodiment, the mis-insertion proof rib 116 is a solid quadrangular prism which extends out upwardly from a side edge of a top surface of one terminal receiving post 112 positioned at rightmost of FIG. 11. But in other embodiments not shown, the number and the providing position of the mis-insertion proof rib 116 may be provided as practically desired.

The plurality of first conductive terminal 12 and the plurality of the terminal receiving post 112 are provided as one-to-one correspondence. Each first conductive terminal 12 is respectively received in one terminal receiving post 112.

A rear end of the first conductive terminal 12 respectively connects one cable 15, the cable 15 passes through the corresponding terminal groove 1111 and extends rearwardly.

A terminal position fixing means 13 is further provided behind the main body portion 111, two sides of the main body portion 111 close to a rear end of the main body portion 111 are each provided with a limiting-position protrusion 1112 which protrudes outwardly. The terminal position fixing means 13 includes a plurality of abutting pieces 131 which extend out forwardly side by side and two limiting-position latches 132 which are positioned respectively at two sides of the plurality of abutting pieces 131, each abutting piece 131 respectively inserts into the respective terminal groove 1111 and is positioned below the respective cable 15, the abutting piece 131 respectively abuts against behind the respective first conductive terminal 12, and the limiting-position latch 132 latches with the respective limiting-position protrusion 1112.

A front end of each abutting piece 131 is branched to form two abutting fingers 1311, front ends of the two abutting fingers 1311 are spaced apart from each other by a distance to form a U-shaped fork which is opened at a front end thereof. A recessed groove 1312 is formed between the two abutting fingers 1311, rear ends of the plurality of abutting pieces 131 are connected with each other to become integral.

The limiting-position latch 132 is opened thereon with a limiting-position groove 1321 which extends along the front-rear direction, the limiting-position groove 1321 latches with the limiting-position protrusion 1112 so as to avoid terminal position fixing means 13 rearwardly moving and detaching from the first insulating body 11 and realize limiting of the terminal position fixing means 13 in position. Preferably, the limiting-position protrusion 1112 has an oblique surface which functions as guiding, the oblique surface is oblique inwardly from front to rear, so that the limiting-position protrusion 1112 is capable of more smoothly latching into the limiting-position groove 1321 of the limiting-position latch 132.

The abutting piece 131 of the terminal position fixing means 13 respectively inserts into the respective terminal groove 1111, the plurality of abutting pieces 131 respectively abut against the plurality of first conductive terminals 12 by one-to-one correspondence, so as to avoid the plurality of first conductive terminals 12 rearwardly moving and make the plurality of first conductive terminals 12 stably positioned in plurality of the terminal receiving posts 112 respectively. When the terminal position fixing means 13 is inserted into the main body portion 111, firstly the terminal position fixing means 13 is pushed into the plurality of terminal grooves 1111 from rear to front, so as to make the plurality of abutting pieces 131 snap into the plurality of terminal grooves 1111 by one-to-one correspondence, so that the plurality of first conductive terminals 12 are firmly hold respectively in the plurality of terminal receiving posts 112 by the terminal position fixing means 13.

Figure 6:
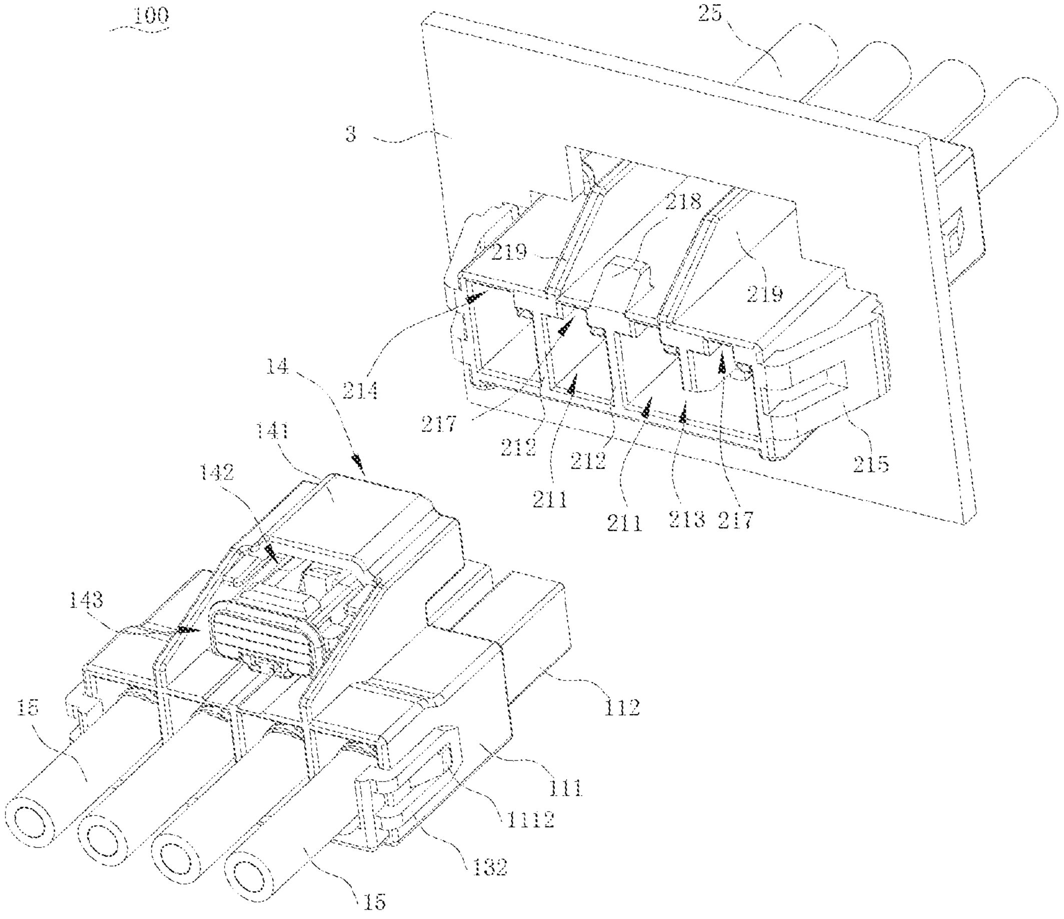
FIG. 6 is perspective exploded view of FIG. 5 viewed from another angle.

Referring to FIG. 6 and FIG. 7, a top portion of the main body portion 111 is provided with a locking means 14 which is used to lock the second electrical connector 2 to make the first electrical connector 1 and the second electrical connector 2 stably connected. The locking means 14 includes a protective shell 141 and an elastic locking arm 142 provided in the protective shell 141, the protective shell 141 has a passageway 144 therein, the elastic locking arm 142 is positioned in the passageway 144 and two inserting grooves 145 are respectively formed between the elastic locking arm 142 and two side walls of the passageway 144. The inserting groove 145 is used to allow a panel limiting-position rib 219 of the second electrical connector 2 to insert therein (described in detail below).

Referring to FIG. 4, FIG. 7 and FIG. 11 to FIG. 13, the elastic locking arm 142 includes a pressing portion 1421 which is positioned at a rear end of the elastic locking arm 142 and a latching hook 1422 which is positioned at a front end of the elastic locking arm 142, an operator downwardly applies a pressure to the pressing portion 1421, may make the latching hook 1422 upwardly move, so that locking is released. When the first electrical connector 1 and the second electrical connector 2 mate with each other, the latching hook 1422 of the elastic locking arm 142 will be raised upwardly and then downwardly move under elastic restoring, hook a latching protrusion 218 of the second electrical connector 2, so that the first electrical connector 1 and the second electrical connector 2 are hooked together.

The present embodiment further includes a connector position assurance means 143 which is separably inserted below the pressing portion 1421. The connector position assurance means 143 includes an elastic arm 1431 and a stopping portion 1432 which is formed at a rear end of the elastic arm 1431 and extends downwardly relative to the elastic arm 1431, a front end of the elastic arm 1431 is provided with a hook portion 1433 which bends downwardly.

A rear end of the stopping portion 1432 is provided with a grasping portion 1434 which is convenient to the operator to hold the connector position assurance means 143 and forwardly insert the connector position assurance means 143 into the elastic locking arm 142.

The connector position assurance means 143 may insert into the passageway 144 from rear to front, the hook portion 1433 of the connector position assurance means 143 upwardly passes over the latching hook 1422, at the same time, the stopping portion 1432 abuts against below the pressing portion 1421, so that the elastic locking arm 142 cannot move to be detached from the first insulating body 11, thereby assuring that the first electrical connector 1 and the second electrical connector 2 are difficult to disengaged with each other even under vibrating environment.

Continuously referring to FIG. 5 to FIG. 13, the second electrical connector 2 includes a second insulating body 21 and a plurality of second conductive terminals 22 mounted in the second insulating body 21.

Because the first electrical connector 1 of the present embodiment is a single row four position electrical connector, the second electrical connector which mates with the first electrical connector 1 also is a single row four position electrical connector. In other embodiments, if the first electrical connector 1 is a multiple row multiple position electrical connector, correspondingly, the second electrical connector 2 also is a multiple row multiple position electrical connector. The second insulating body 21 substantially is square, an interior of the second insulating body 21 has a plurality of mating cavities 211 which are positioned in the front of the second insulating body 21, are square and each have a first depth D1 and a plurality of receiving cavities 220 which are positioned at the rear of the second insulating body 21. Front portions of the plurality of second conductive terminals 22 are received in the respective mating cavities 211, and rear portions of the plurality of second conductive terminals 22 are received the respective receiving cavities 220. A rear end of each second conductive terminal 22 respectively connects one cable 25, the cable 25 passes through the corresponding receiving cavity 220 and extends rearwardly.

The plurality of mating cavities 211 and the plurality of terminal receiving posts 112 of the first electrical connector 1 are provided as one-to-one correspondence, and the plurality of terminal receiving posts 112 of the first electrical connector 1 correspondingly insert into the plurality of mating cavities 211 of the second electrical connector 2 respectively.

Figure 9:
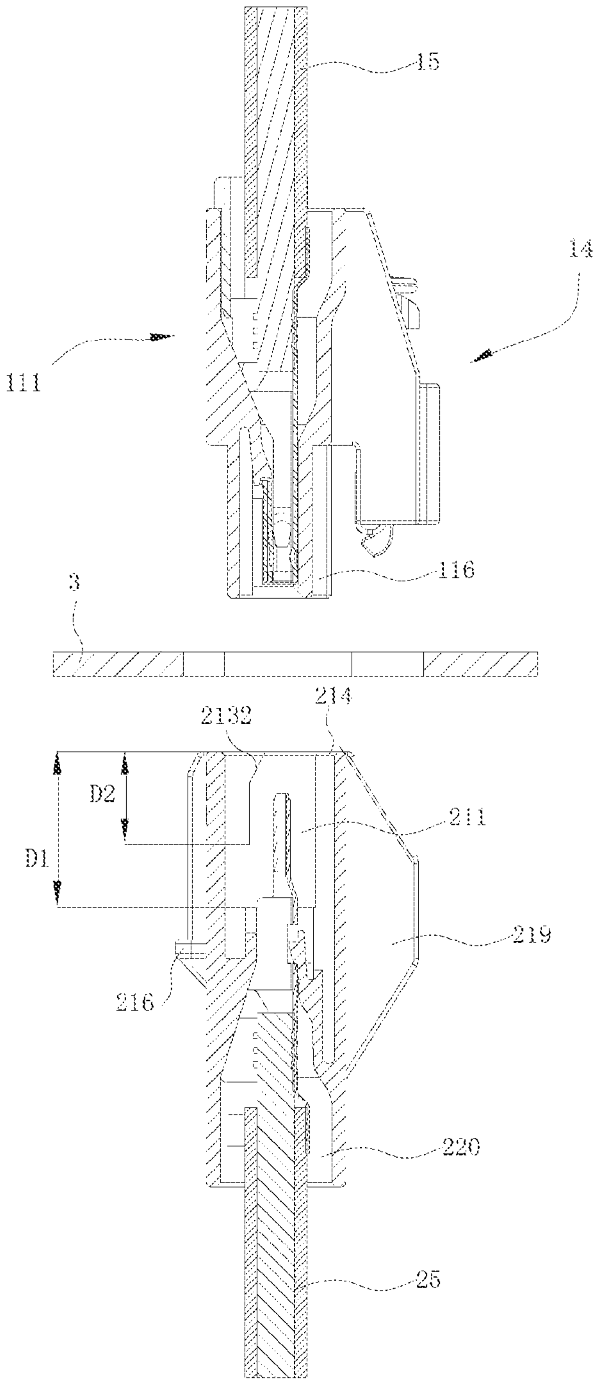
FIG. 9 is a cross sectional view of FIG. 8 taken along a D-D line.
Figure 10:
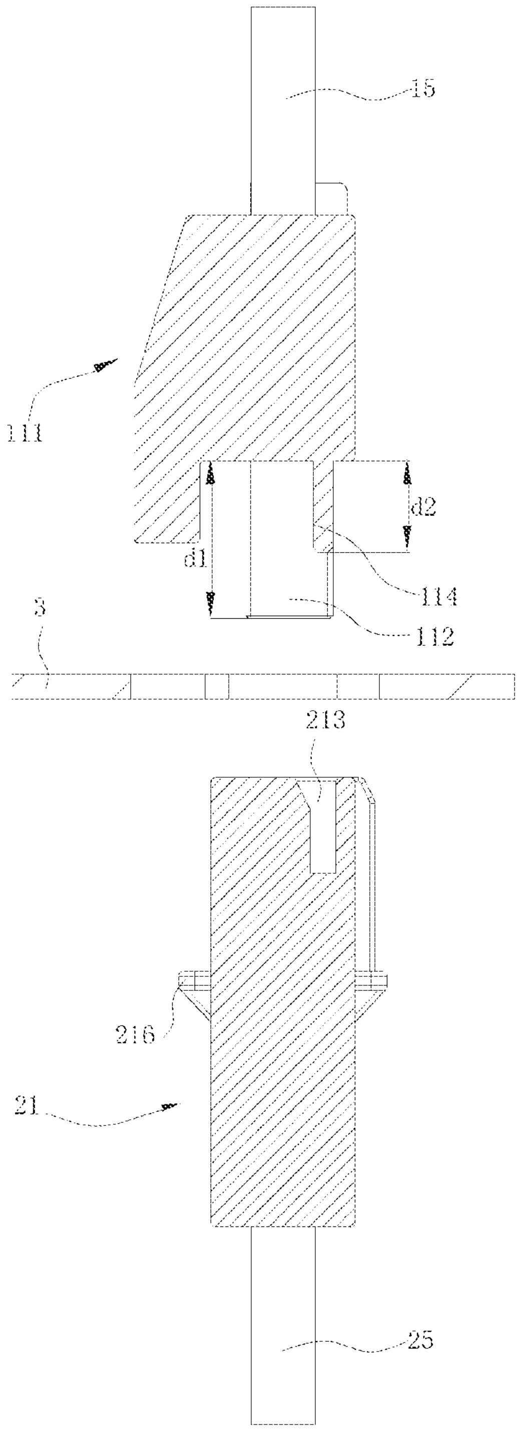
FIG. 10 is a cross sectional view of FIG. 8 taken along an E-E line.
Figure 11:
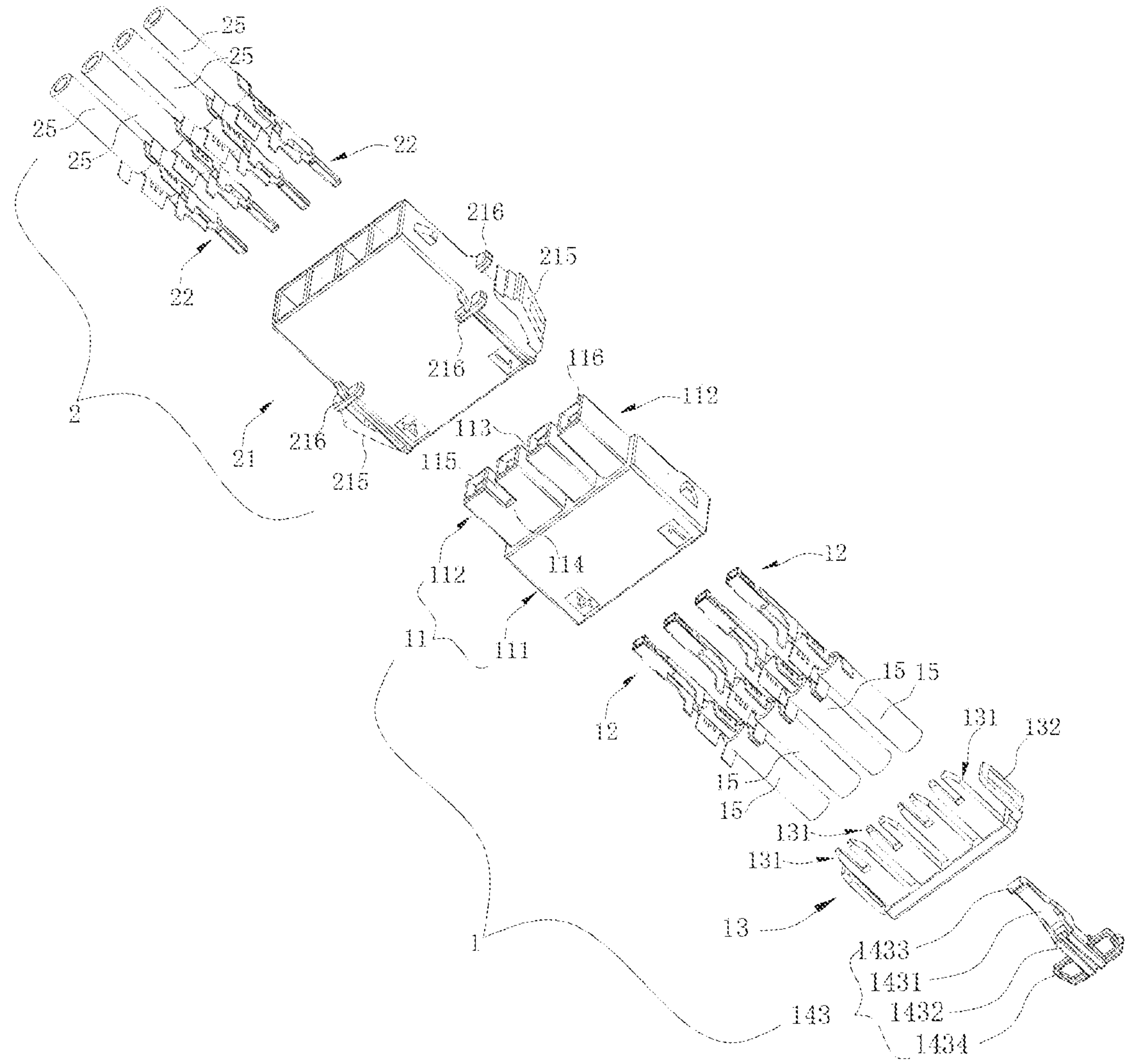
FIG. 11 is a perspective exploded view of the first electrical connector and the second electrical connector of the first embodiment of the present disclosure.
Figure 12:
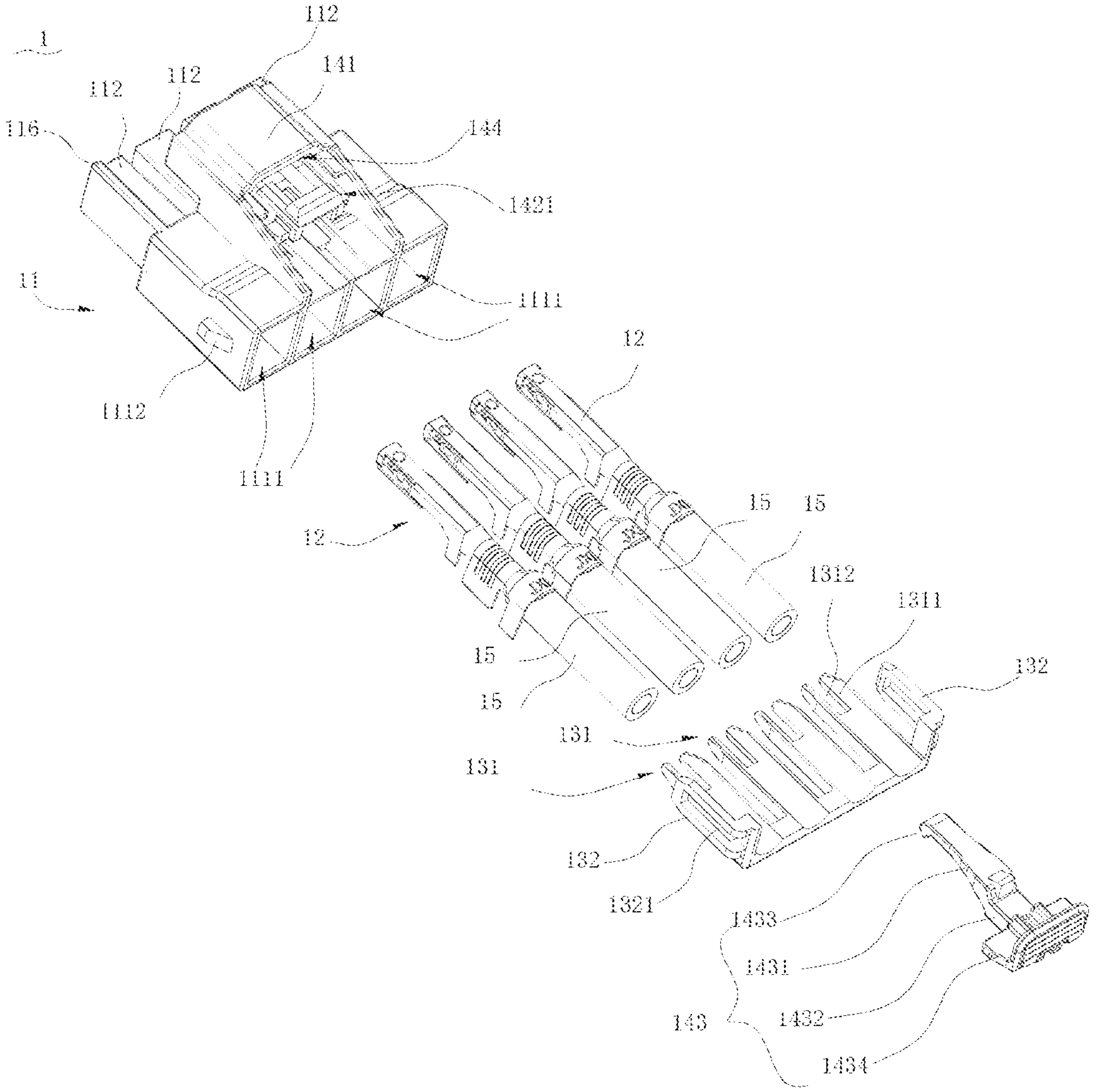
FIG. 12 is a perspective exploded view of the first electrical connector of the first embodiment of the present disclosure.
Figure 16:
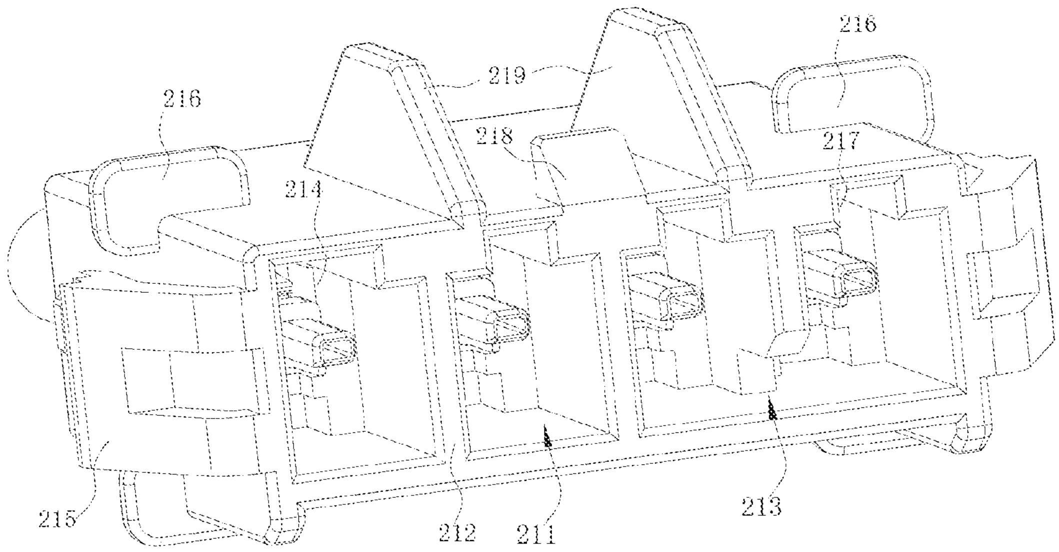
FIG. 16 is a perspective view of the second electrical connector of the first embodiment of the present disclosure.
Figure 17:
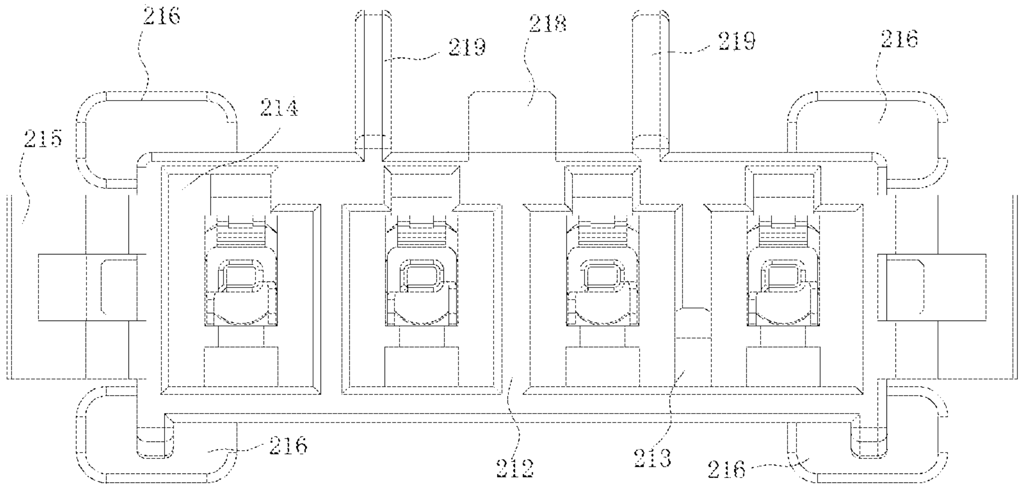
FIG. 17 is a front view of FIG. 16.

As shown in FIG. 9, in combination with FIG. 16 and FIG. 17, the two adjacent mating cavities 211 is formed there between with a partitioning wall 212 which extends in the front-rear direction, at least one partitioning wall 212 is formed with a mis-insertion proof notch 213 which is opened toward the front and has a second depth D2, a front end of the mis-insertion proof notch 213 is provided with a guiding-in oblique surface 2132. The second depth D2 is less than the first depth D1 of the mating cavity 211, such a depth provision may provide a mis-insertion proof structure at the same time assure that the mating cavity 211 further has better structural strength. The second depth d2 and the first depth D1 each refer to a size along front-rear direction, the second depth D2 and the first depth D1 of the second electrical connector 2 are preferably equal to or slightly larger than the second depth d2 and the first depth d1 of the first electrical connector 1, which thus may allow the first electrical connector 1 to sufficiently insert into the second electrical connector 2.

The mis-insertion proof notch 213 of the second electrical connector 2 corresponds to the mis-insertion proof connecting board 114 of the first electrical connector 1, and the mis-insertion proof connecting board 114 is inserted into and received in the mis-insertion proof notch 213 of the second electrical connector 2. The second depth D2 of the mis-insertion proof notch 213 is matched with an extending length of the mis-insertion proof connecting board 114 along the front-rear direction, so that the mis-insertion proof connecting board 114 is capable of inserting into the mis-insertion proof notch 213 of the second electrical connector 2. The mis-insertion proof connecting board 114 of the first electrical connector 1 and the mis-insertion proof notch 213 of the second electrical connector 2 constitute a first mis-insertion proof structure, the mis-insertion proof connecting board 114 of the first electrical connector 1 and the mis-insertion proof notch 213 of the second electrical connector 2 cooperate with each other to make the first electrical connector 1 and the second electrical connector 2 properly mate with each other, avoid the first electrical connector 1 and the second electrical connector 2 wrongly mating with an electrical connector having other function. And cooperating combinations of the number and the positions of the mis-insertion proof connecting board 114 and the mis-insertion proof notch 213 of the second electrical connector 2 make that the mis-insertion proof structure may have various different solutions. And, such a mis-insertion proof structure that the mis-insertion proof connecting board 114 of the first electrical connector 1 correspondingly inserts into the mis-insertion proof notch 213 of the second electrical connector 2 utilizes a spacing between the two adjacent terminal receiving posts 112 and the portioning wall 212 between two adjacent mating cavities 211, which does not increase sizes of the appearances of the first electrical connector 1 and the second electrical connector 2, the first electrical connector 1 and the second electrical connector 2 have advantages of small volume and compact structure, is particularly adapted to a small size electrical connector which has the less number of conductive terminals.

In addition, a top portion or a bottom portion of at least one mating cavities 211 is formed with a mis-insertion proof avoiding opening 214, the mis-insertion proof avoiding opening 214 corresponds to the first electrical connector 1 of the mis-insertion proof rib 116 in position, so that the mis-insertion proof rib 116 may correspondingly insert into the mis-insertion proof avoiding opening 214.

Figure 13:
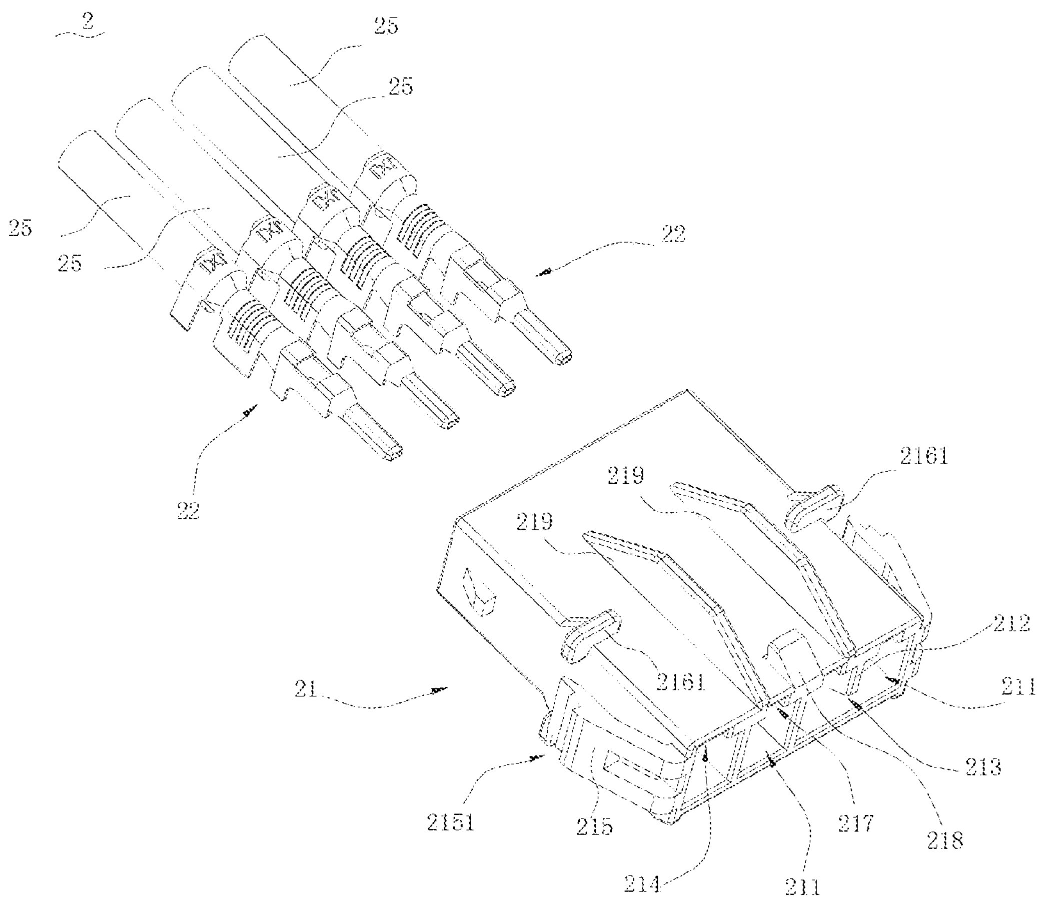
FIG. 13 is a perspective exploded view of the second electrical connector of the first embodiment of the present disclosure.

As shown in FIG. 16 and FIG. 17, a notch 217 protrudes upwardly from a center of the top portion of each mating cavity 211, a width of the notch 217 is less than a width of the mating cavity 211 along a left-right direction, here the notch 217 of at least one mating cavity 211 expands toward a side, so that the expanded width of the notch 217 of the at least one mating cavity 211 is larger than a width of the notch 217 of each of the other mating cavities 211, and the notch 217 which has a larger width constitutes the mis-insertion proof avoiding opening 214. As shown in FIG. 13 and FIG. 16, the mis-insertion proof avoiding opening 214 of the present embodiment is positioned above the mating cavity 211 which is at the left of the second electrical connector 2.

The mis-insertion proof avoiding opening 214 and the mis-insertion proof rib 116 constitute a second mis-insertion proof structure. Selection of the number of the mis-insertion proof rib 116 and the mis-insertion proof avoiding opening 214 and cooperation of providing positions of the mis-insertion proof rib 116 and the mis-insertion proof avoiding opening 214 make that the second mis-insertion proof structure may have various different solutions.

Therefore, the electrical connector assembly 100 of the present disclosure includes the two mis-insertion proof structures, that is, the first mis-insertion proof structure and the second mis-insertion proof structure, and the two mis-insertion proof structures are capable of obtaining more various mis-insertion proof solutions by different combination manners, so that the electrical connector assembly 100 of the present disclosure is capable of being applied in complicated application circumstance which have many electrical connectors with similar appearances, avoid the electrical connectors which have different functions wrongly mating with each other.

Two sides of the second insulating body 21 each are provided with a panel latch 215, a front end of the second electrical connector 2 may insert into the penetrating hole 31 of the fixing panel 3, and latches with the fixing panel 3 together. One end of the panel latch 215 is fixed on the second insulating body 21, the other end of the panel latch 215 is suspended and has a distance from a side wall of the second insulating body 21. Specifically, in the present embodiment, a front end of the panel latch 215 is connected to the second insulating body 21, a rear end of the panel latch 215 is suspended, when the second insulating body 21 latches with the fixing panel 3, the rear ends of the two panel latches 215 approach each other, so that the second insulating body 21 smoothly latches with the fixing panel 3. After the second insulating body 21 latches with the fixing panel 3, a preload generated by the suspended rear ends of the two panel latches 215 makes the second insulating body 21 stably latch with the fixing panel 3.

Furthermore, the panel latch 215 has multiple steps 2151, the second electrical connector 2 further includes panel stopping portions 216 which protrude and are provided at two sides of a top portion of the second insulating body 21 and two sides of a bottom portion of the second insulating body 21, the panel stopping portion 216 has a vertical stopping surface 2161 which faces toward the front. The panel stopping portion 216 which protrudes is used to abut against one side of the fixing panel 3 when the second insulating body 21 latches with the fixing panel 3, at the same time the panel latch 215 abuts against the other side of the fixing panel 3, so that the second electrical connector 2 is reliably fixed on the fixing panel 3.

A latching protrusion 218 is provided at a middle position of the top portion of the second insulating body 21 and two panel limiting-position ribs 219 are respectively provided at two sides of the latching protrusion 218.

Figure 1:
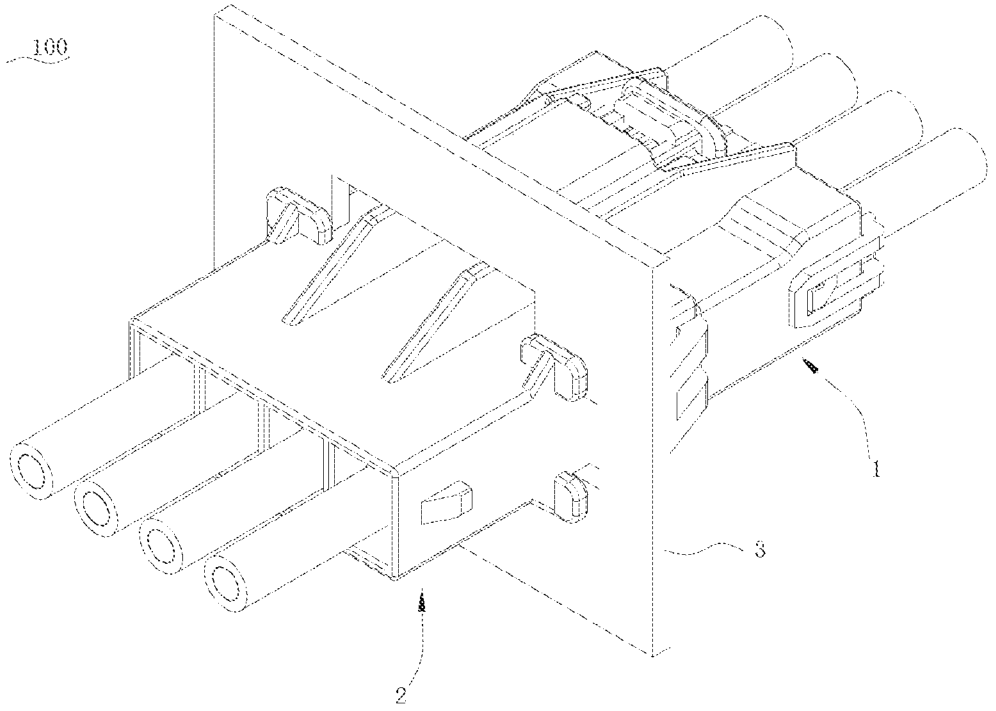
FIG. 1 is a perspective view of a first embodiment of an electrical connector assembly of the present disclosure.
Figure 2:
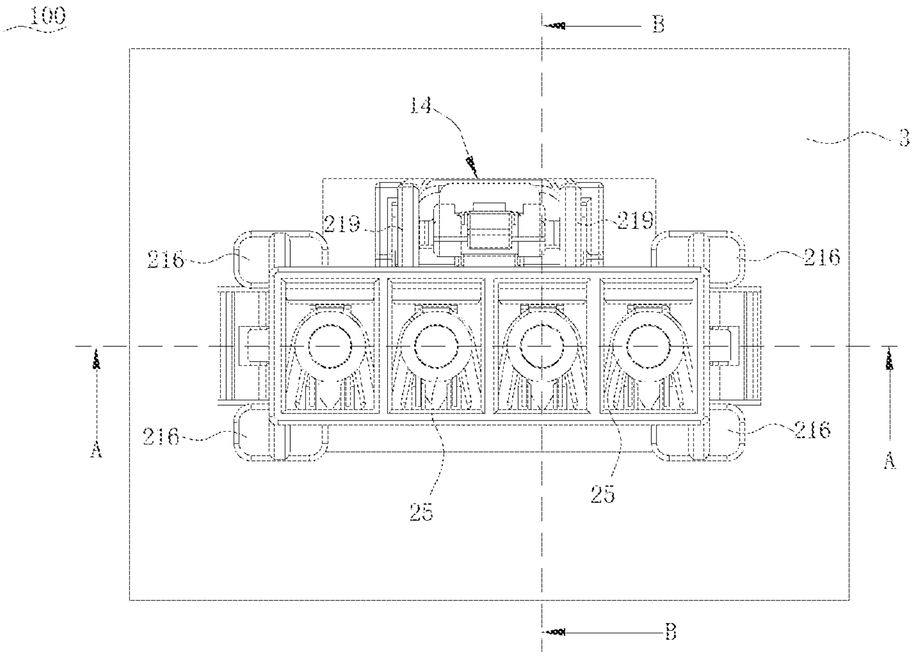
FIG. 2 is a front view of FIG. 1.
Figure 3:
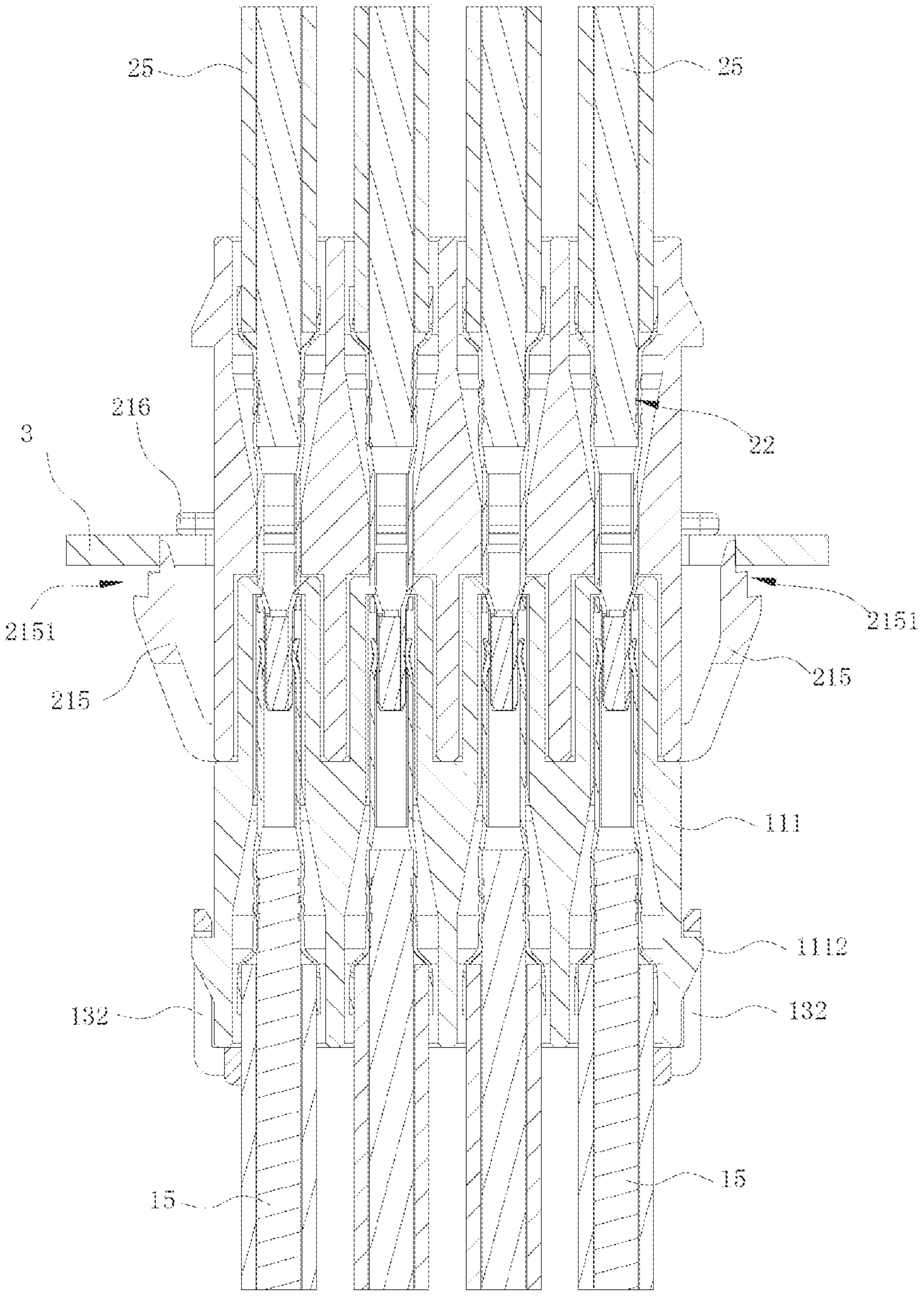
FIG. 3 is a cross sectional view of FIG. 2 taken along an A-A line.
Figure 4:
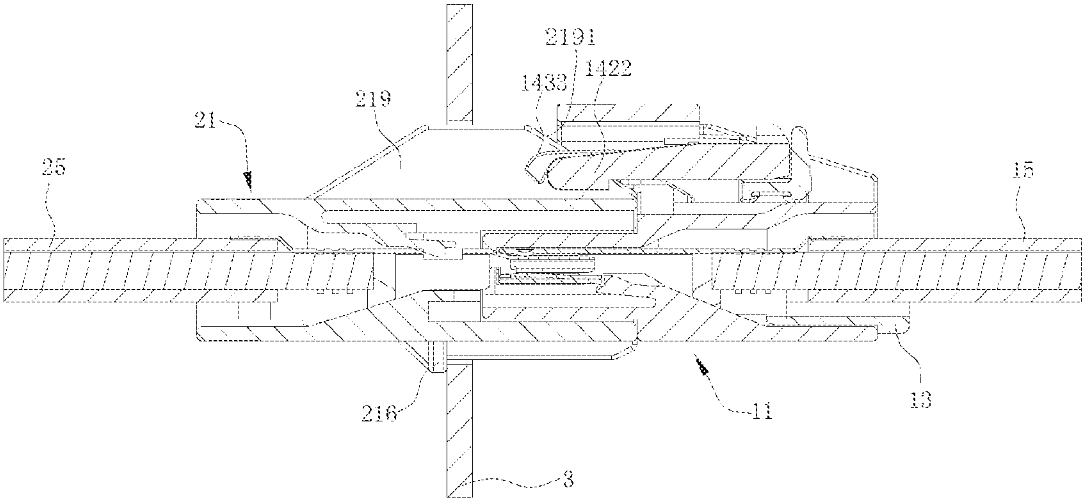
FIG. 4 is a cross sectional view of FIG. 2 taken along a B-B line.
Figure 5:
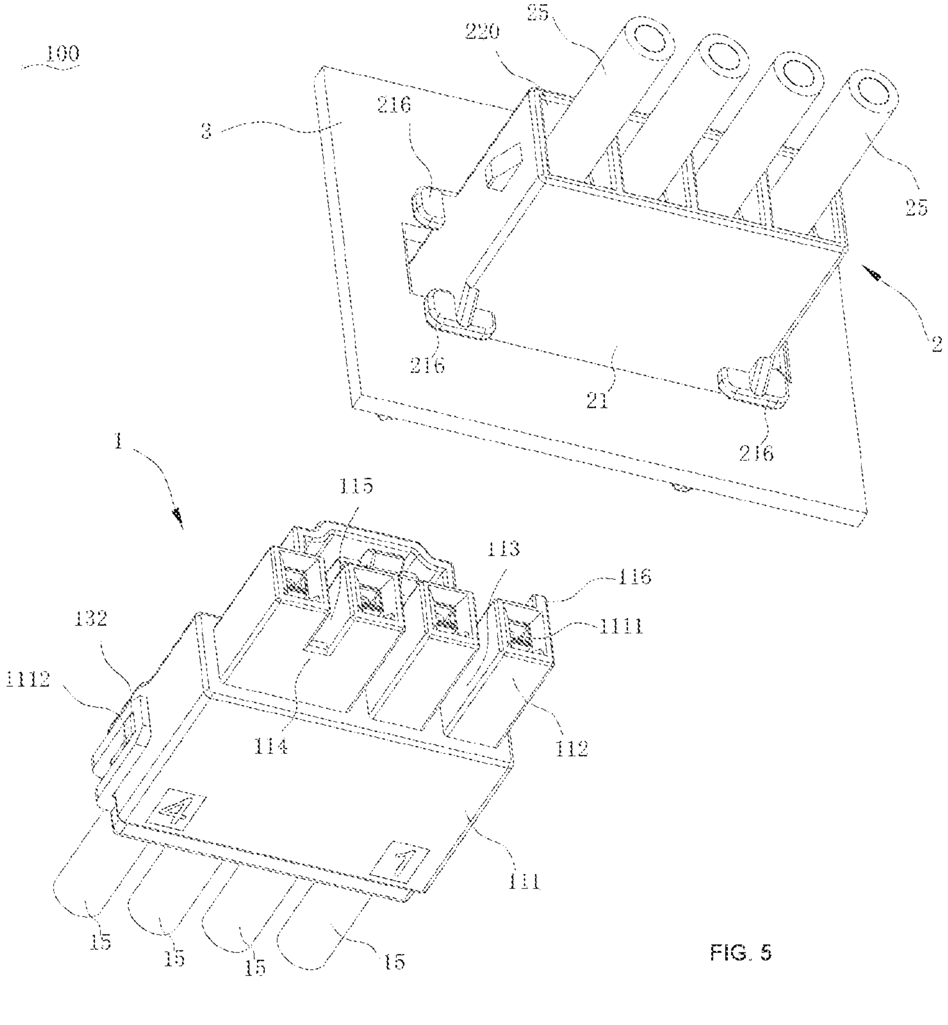
FIG. 5 is a perspective exploded view of a fixing panel, a first electrical connector and a second electrical connector of the first embodiment of the electrical connector assembly of the present disclosure.

When the first electrical connector 1 and the second electrical connector 2 are connected, the two panel limiting-position ribs 219 pass through the penetrating hole 31 of the fixing panel 3, and then correspondingly insert into the two inserting grooves 145 of the locking means 14. As shown in FIG. 4, a front side of the panel limiting-position rib 219 has a guiding oblique surface 2191 to make that the second electrical connector 2 may be smoothly aligned with the penetrating hole 31 and insert into the penetrating hole 31, top portions of the two panel limiting-position ribs 219 attach a lower edge of the penetrating hole 31, so that the second electrical connector 2 may insert into the penetrating hole 31 under size matching, which is beneficial to reduce shaking of the second electrical connector 2 happening under vibrating environment.

In the electrical connector assembly 100 of the present embodiment, the first electrical connector 1 includes a mis-insertion proof connecting board 114 which is connected between the two adjacent terminal receiving posts 112 and a mis-insertion proof rib 116 which protrudes upwardly from at least one terminal receiving post 112, the second electrical connector 2 includes the mis-insertion proof notch 213 which is formed on at least one partitioning wall 212 and is opened toward the front and the mis-insertion proof avoiding opening 214 which is provided to at least one the mating cavity 211, the mis-insertion proof connecting board 114 inserts into the mis-insertion proof notch 213 of the second electrical connector 2, the mis-insertion proof rib 116 correspondingly inserts into the mis-insertion proof avoiding opening 214, so that first conductive terminal 12 and second conductive terminal 22 correspondingly establish an electrical connection, the electrical connector assembly 100 includes two mis-insertion proof structures, and the mis-insertion proof connecting board 114 and the mis-insertion proof rib 116 may be combined therebetween into different combinations, correspondingly, the mis-insertion proof notch 213 and the mis-insertion proof avoiding opening 214 of the second electrical connector 2 are provided corresponding to the mis-insertion proof connecting board 114 and the mis-insertion proof rib 116 respectively, thus more various mis-insertion proof combination solutions can be obtained, so that electrical connectors which are in different uses but have similar appearances can be avoided wrongly mating, which is particularly adapted to complicated application circumstance.

Referring to FIG. 18 to FIG. 21, an electrical connector assembly of the present preferred embodiment similarly includes a first electrical connector 7 and a second electrical connector 8, and a fixing panel which is used to fix the second electrical connector 8.

The second embodiment mainly differs from the first embodiment in that: providing positions of the mis-insertion proof connecting board 714 and the mis-insertion proof rib 716 of the first electrical connector 7 are different, providing positions of the mis-insertion proof notch 813 and the mis-insertion proof avoiding opening 814 of the second electrical connector 8 are different.

Figure 14:
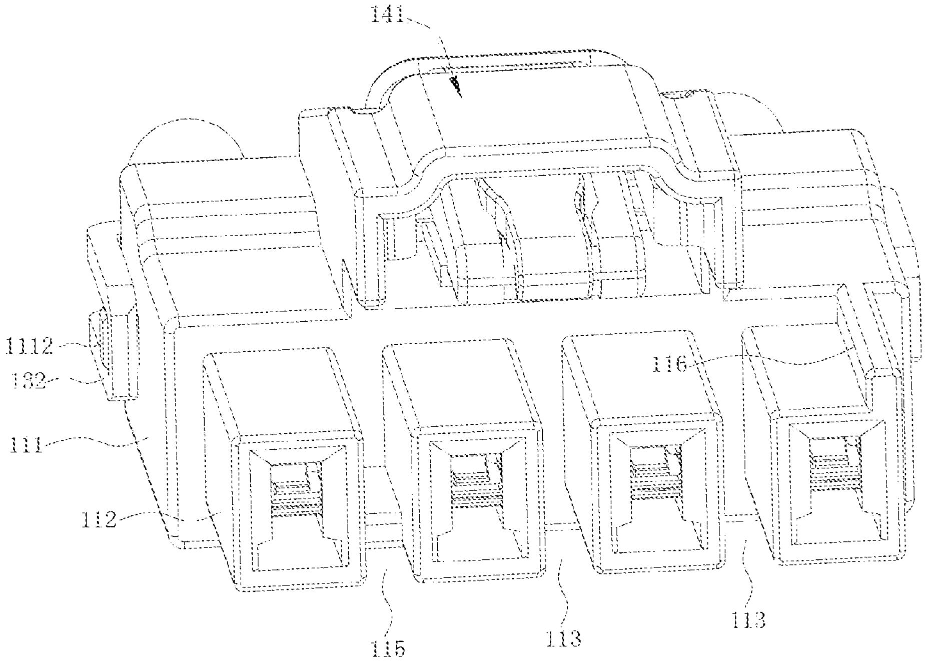
FIG. 14 is a perspective view of the first electrical connector of the first embodiment of the present disclosure.
Figure 15:
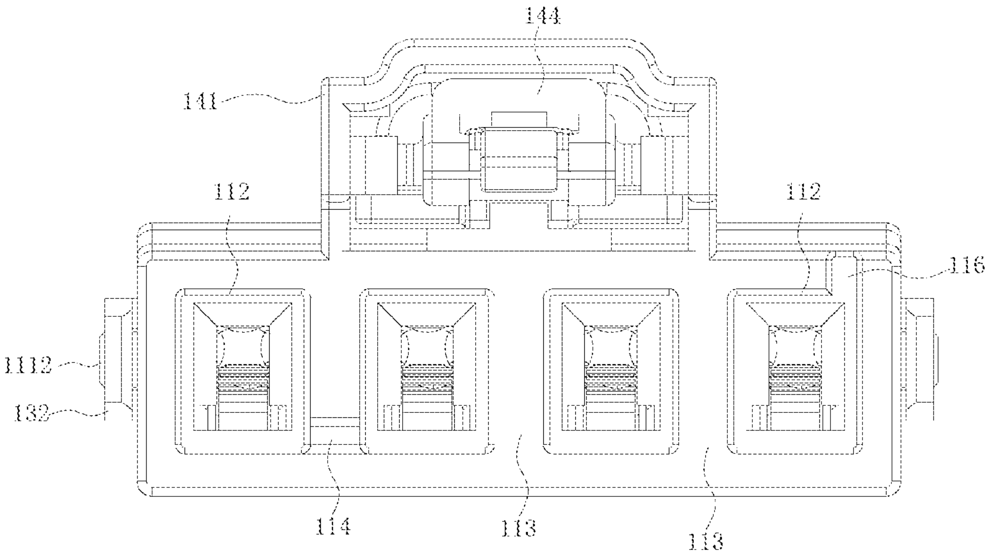
FIG. 15 is a front view of FIG. 14.
Figure 18:
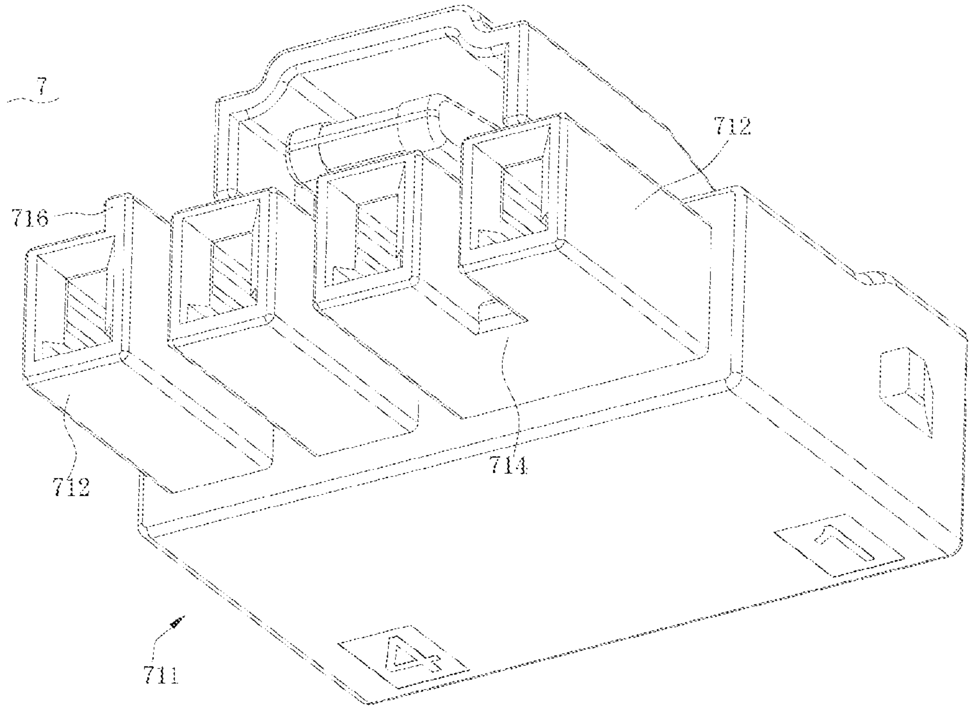
FIG. 18 is a perspective view of a first electrical connector of a second embodiment of the present disclosure.
Figure 19:
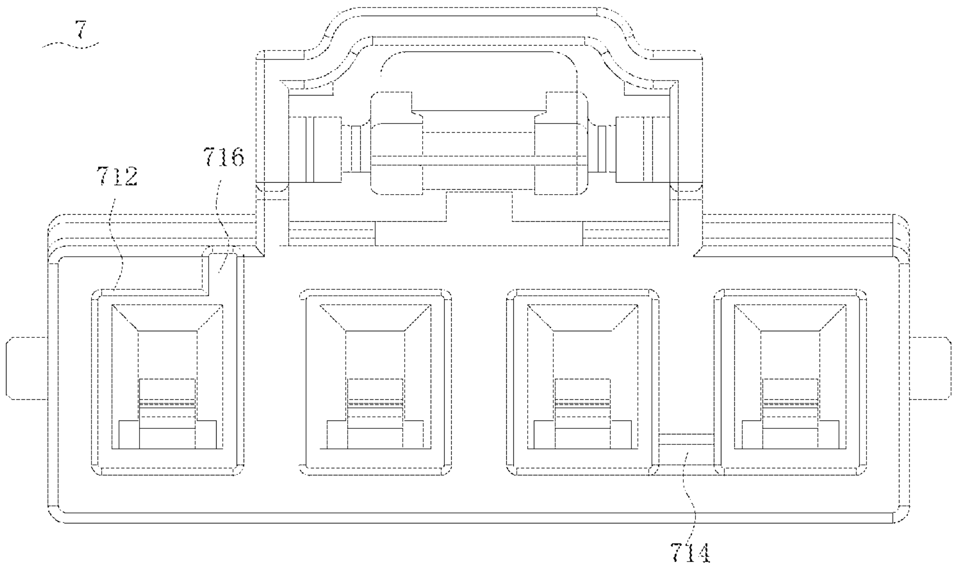
FIG. 19 is a front view of FIG. 18.

As shown in FIG. 18 and FIG. 19, similar to the first embodiment, a first insulating body of the first electrical connector 7 also includes a main body portion 711 and a plurality of terminal receiving posts 712. Differing from the first embodiment in that, the mis-insertion proof connecting board 714 of the second embodiment is provided between the two adjacent terminal receiving posts 712 which are at rightmost (in the first embodiment, provided between the two adjacent terminal receiving posts 112 which are at leftmost, taking a view direction of FIG. 14 as reference, view directions of FIG. 14 and FIG. 18 are from front to rear). The mis-insertion proof rib 716 of the first electrical connector 7 is provided on the terminal receiving post 712 which is positioned leftmost, is positioned at a right side which close to the adjacent terminal receiving post 712 (in the first embodiment, is provided on the terminal receiving post 112 which is positioned at rightmost, and is away from the adjacent terminal receiving post 112).

Figure 20:
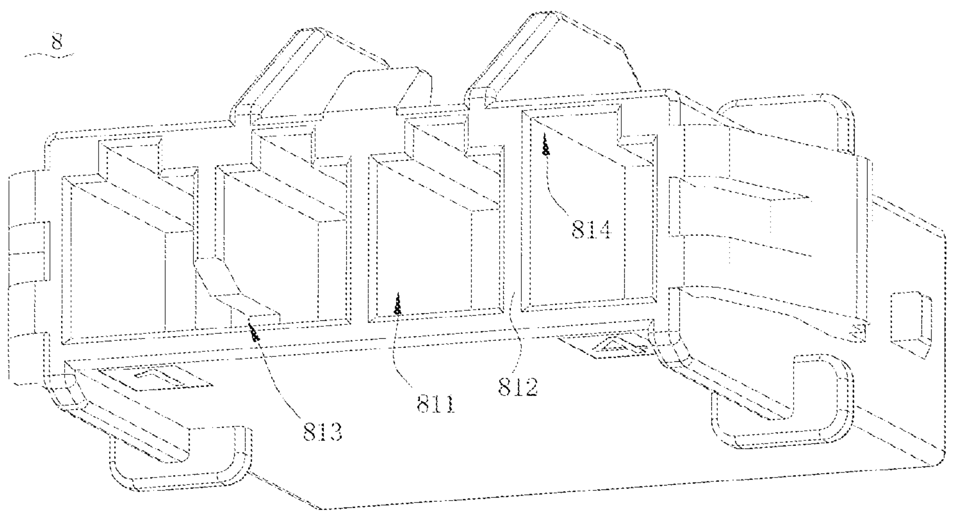
FIG. 20 is a perspective view of a second electrical connector of the second embodiment of the present disclosure.
Figure 21:
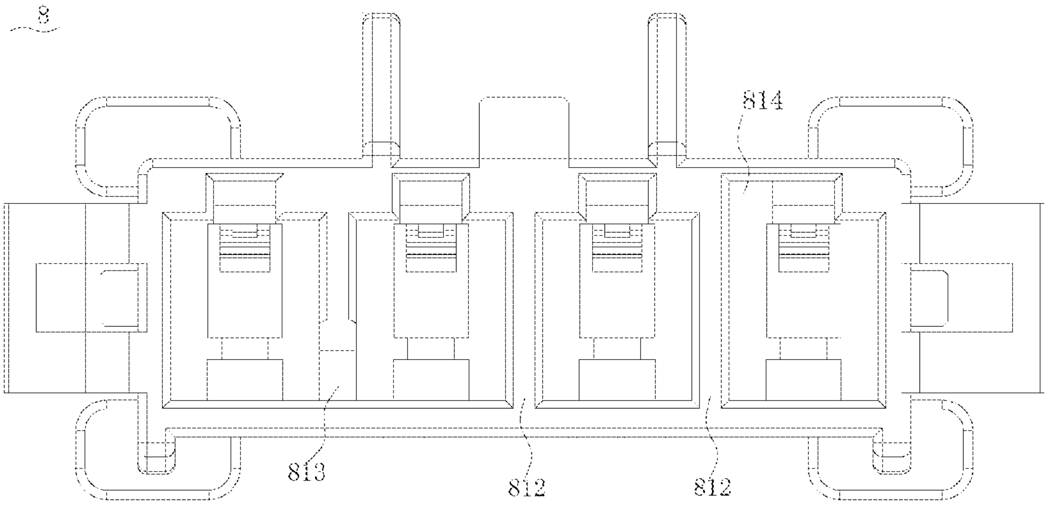
FIG. 21 is a front view of FIG. 20.

As shown in FIGS. 20 and 21, similar to the first embodiment, a second insulating body of the second electrical connector 8 also has a plurality of mating cavities 811 which each have a first depth, the two adjacent mating cavities 811 is formed therebetween with a partitioning wall 812 which extends in the front-rear direction, one partitioning wall 812 is formed with a mis-insertion proof notch 813 which is opened toward the front and has a second depth, a top portion of another mating cavity 811 is formed with a mis-insertion proof avoiding opening 814, and the mis-insertion proof notch 813 and the mis-insertion proof avoiding opening 814 are provided corresponding to the mis-insertion proof connecting board 714 and the mis-insertion proof rib 716 of the first electrical connector 7. That is, the mis-insertion proof notch 813 is provided on the leftmost partitioning wall 812 (in the first embodiment, is provided on the rightmost partitioning wall, taking a view direction of FIG. 20 as reference, view directions of FIG. 16 and FIG. 20 are from front to rear), but the mis-insertion proof avoiding opening 814 is provided to a top portion of the rightmost mating cavity 811 (in the first embodiment, provided to the top portion of the leftmost mating cavity).

Because the positions of the mis-insertion proof connecting board 714 and the mis-insertion proof rib 716 of the first electrical connector 7 are different, the positions of the mis-insertion proof notch 813 and the mis-insertion proof avoiding opening 814 of the second electrical connector 8 are also different, so that the electrical connector assembly of the second embodiment and the electrical connector assembly electrical connector assembly of the first embodiment are distinguish from each other, and cannot correspondingly mate with and engage with each other.

Description of other structures of the electrical connector assembly of the second embodiment is the same as that of the first embodiment, may refer to the electrical connector assembly of the previous first embodiment, is not repeated herein.

In other embodiments not shown, the number and positions of the mis-insertion proof connecting board and the mis-insertion proof rib of the first electrical connector and the number and positions of the mis-insertion proof notch and the mis-insertion proof avoiding opening of the second electrical connector may be provided as practically desired.

Although the present disclosure has been described with reference to typical embodiments, it should be understood that the terms used are illustrative and exemplary rather than restrictive. Since the present disclosure can be implemented in multiple forms without departing from the spirit or essence of the present disclosure, it should be understood that the above implementation manners are not limited to any of the aforementioned details, but should be broadly interpreted within the spirit and scope defined by the appended claims. Therefore, all changes and modifications fallen within the scope of the claims or equivalent thereof should be covered by the appended claims.

What is claimed is:

1. An electrical connector comprising:

an insulating body comprising a main body portion, a plurality of terminal receiving posts extending forwardly from a front end of the main body portion, a mis-insertion proof connecting board between two adjacent ones of the terminal receiving posts, and mis-insertion proof rib extending from one of the terminal receiving posts, each terminal receiving post being a hollow post shape which has a forward open end, the plurality of terminal receiving posts being spaced apart from each other and openings are provided between adjacent ones of the terminal receiving posts, each opening having a first depth defined between front edges of the adjacent posts and the front end of the main body portion, a front edge of the mis-insertion proof connecting board being positioned behind the front edges of the two adjacent ones of the terminal receiving posts so that a notch having a second depth is formed therebetween, the second depth being less than the first depth, and the mis-insertion proof rib protruding upwardly or downwardly from the terminal receiving post; and a plurality of conductive terminals, the plurality of conductive terminals being respectively received in the plurality of terminal receiving posts.

2. The electrical connector of claim 1, wherein the mis-insertion proof rib is a solid quadrangular prism which protrudes upwardly from a side of a top surface of the corresponding terminal receiving post.

3. The electrical connector of claim 1, wherein the main body portion has a plurality of terminal grooves which are partitioned from each other, each terminal groove is correspondingly communicated with one of the terminal receiving posts, and two sides of the main body portion are each provided with a limiting-position protrusion, a rear portion of the main body portion is further provided with a plurality of abutting pieces which forwardly protrude and two limiting-position latches which are positioned at two sides of the plurality of abutting pieces, each abutting piece respectively abuts against one of the corresponding conductive terminals, the two limiting-position latches respectively latch with the two limiting-position protrusions.

4. The electrical connector of claim 1, wherein the mis-insertion proof connecting board is connected between lower edges of the two adjacent terminal receiving posts, and a rear side of the mis-insertion proof connecting board is connected to the main body portion; and a top portion of the main body portion includes a protective shell and an elastic locking arm provided in the protective shell.

5. An electrical connector, comprising:

an insulating body having a top portion and an interior the top portion having a latching protrusion protruding upwardly and two panel limiting-position ribs which are respectively provided at two sides of the latching protrusion, and the interior being provided with a plurality of mating cavities which extend along a front-rear direction and each have a first depth, two adjacent mating cavities being formed therebetween with a partitioning wall, at least one partitioning wall being formed thereon with a mis-insertion proof notch which is opened toward a front of the insulating body and has a second depth, the second depth being less than the first depth, a top portion or a bottom portion of at least one mating cavity being formed with a mis-insertion proof avoiding opening, wherein a front side of the latching protrusion, front sides of the two panel limiting-position ribs and a front side of the mis-insertion proof notch each have a guiding oblique surface; and a plurality of conductive terminals, the plurality of conductive terminals being respectively received in the plurality of mating cavities.

6. The electrical connector of claim 5, wherein two sides of the insulating body each are provided with a panel latch, a front end of each panel latch is connected on the insulating body, a rear end of each panel latch is suspended and has a gap from a side wall of the insulating body, a rear wall surface of each panel latch is provided thereon with multiple steps.

7. The electrical connector of claim 6, wherein the insulating body further comprises panel stopping portions which protrude and are provided at two sides of the top portion of the insulating body and two sides of a bottom portion of the insulating body, each panel stopping portion has a vertical stopping surface which faces toward the front.

8. The electrical connector of claim 5, wherein a center of a top portion of each mating cavity is provided with a notch which protrudes upwardly, a width of the respective notch is less than a width of the respective mating cavity, the notch of at least one mating cavity expands toward a side thereof and defines an expanded width which is larger than the width of the notch of each of the other mating cavities and comprises the mis-insertion proof avoiding opening.

9. The electrical connector, of claim 1 which forms a first electrical connector and further in combination with a second electrical connector, comprising:

a second insulating body, an interior of the second insulating body being provided with a plurality of mating cavities which extend along a front-rear direction and each have a first depth, two adjacent mating cavities of the second insulating body being formed therebetween with a partitioning wall, at least one partitioning wall being formed thereon with a mis-insertion proof notch which is opened toward a front of the second insulating body and has a second depth, the second depth of the second insulating body being less than the first depth of the second insulating body, a top portion or a bottom portion of at least one mating cavity of the second insulating body being formed with a mis-insertion proof avoiding opening, and a plurality of second conductive terminals, the plurality of second conductive terminals being respectively received in the plurality of mating cavities of the second insulating body, wherein the terminal receiving post of the first electrical connector insert into the respective mating cavities of the second electrical connector, so that the conductive terminals of the first electrical connector and the second conductive terminals correspondingly establish electrical connections, the mis-insertion proof rib inserts into the mis-insertion proof avoiding opening, the mis-insertion proof connecting board inserts into the mis-insertion proof notch of the second electrical connector.

10. The electrical connector of claim 1, wherein the mis-insertion proof connecting board is connected to the two adjacent terminal receiving posts and connected to the main body portion.

11. The electrical connector of claim 1, wherein the mis-insertion proof connecting board is connected between lower edges of the two adjacent terminal receiving posts, and a rear side of the mis-insertion proof connecting board is connected to the main body portion.

12. The electrical connector of claim 1, wherein the mis-insertion proof connecting board has a height defined between upper and bottom surfaces thereof which is less than the height of the terminal receiving posts defined between top and bottom surfaces thereof.

13. The first and second electrical connectors of claim 9, wherein two sides of the second insulating body each are provided with a panel latch, a front end of the panel latch is connected on the second insulating body, a rear end of the panel latch is suspended and has a gap from a side wall of the second insulating body, a rear wall surface of the panel latch is provided thereon with multiple steps.

14. The first and second electrical connectors of claim 13, wherein the second insulating body further comprises panel stopping portions which protrude and are provided at two sides of a top portion of the second insulating body and two sides of a bottom portion of the second insulating body, each panel stopping portion has a vertical stopping surface which faces toward the front.

15. The first and second electrical connectors of claim 9, wherein a center of a top portion of each mating cavity of the second connector is provided with a notch which protrudes upwardly, a width of the notch of the second connector is less than a width of the respective mating cavity of the second connector, the notch of at least one mating cavity of the second connector expands toward a side thereof to define an expanded width which is larger than the width of the notch of each of the other mating cavities of the second connector, the notch of the second connector which has the larger width comprises the mis-insertion proof avoiding opening of the second connector.

16. The first and second electrical connectors of claim 15, wherein a top portion of the second insulating body has a latching protrusion which protrudes upwardly and two panel limiting-position ribs which are respectively provided at two sides of the latching protrusion, and a front side of the latching protrusion, front sides of the two panel limiting-position ribs and a front side of the mis-insertion proof notch of the second connector each are provided with a guiding oblique surface.

17. The first and second electrical connectors of claim 9, wherein the mis-insertion proof rib is a solid quadrangular prism which protrudes upwardly from a side of a top surface of the corresponding terminal receiving post.

18. The first and second electrical connectors of claim 9, wherein the main body portion of the first electrical connector has a plurality of terminal grooves which are partitioned from each other, each terminal groove is correspondingly communicated with one of the terminal receiving posts, and two sides of the main body portion of the first electrical connector are each provided with a limiting-position protrusion, a rear portion of the main body portion of the first electrical connector is further provided with a plurality of abutting pieces which forwardly protrude and two limiting-position latches which are positioned at two sides of the plurality of abutting pieces, each abutting piece respectively abuts against one of the corresponding conductive terminals of the first electrical connector, the two limiting-position latches respectively latch with the two limiting-position protrusions.

19. The first and second electrical connectors of claim 9, wherein the mis-insertion proof connecting board is connected between lower edges of the two adjacent terminal receiving posts, and a rear side of the mis-insertion proof connecting board is connected to the main body portion of the first electrical connector.

20. The first and second electrical connectors of claim 19, wherein a top portion of the main body portion of the first electrical connector includes a protective shell and an elastic locking arm provided in the protective shell.

* * * * *